(12) United States Patent
Hsu et al.

(10) Patent No.: US 8,850,912 B2
(45) Date of Patent: Oct. 7, 2014

(54) LINKAGE-TYPE SYNCHRONOUS SLIDE STRUCTURE OF RELATIVE SLIDE ASSEMBLY

(75) Inventors: An Szu Hsu, New Taipei (TW); Way Han Dai, New Taipei (TW); Hsiu Fan Ho, New Taipei (TW)

(73) Assignee: First Dome Corporation, New Taipei (TW)

( * ) Notice: Subject to any disclaimer, the term of this patent is extended or adjusted under 35 U.S.C. 154(b) by 256 days.

(21) Appl. No.: 13/446,410

(22) Filed: Apr. 13, 2012

(65) Prior Publication Data

US 2013/0272632 A1    Oct. 17, 2013

(51) Int. Cl.
*F16H 21/44*    (2006.01)
*F16H 21/54*    (2006.01)
*F16H 25/18*    (2006.01)
*H04M 1/00*    (2006.01)

(52) U.S. Cl.
USPC ...................................... 74/100.1; 455/575.4

(58) Field of Classification Search
CPC .. H04M 1/0235; H04M 1/0237; G06F 1/1624
USPC ................... 74/100.1; 455/575.1, 575.4, 348
See application file for complete search history.

(56) References Cited

U.S. PATENT DOCUMENTS

| 7,979,100 | B2 * | 7/2011 | Tang | 455/575.4 |
| 8,077,450 | B2 * | 12/2011 | Shen | 361/679.3 |
| 2008/0158832 | A1 * | 7/2008 | Park et al. | 361/727 |
| 2010/0113110 | A1 * | 5/2010 | Lee | 455/575.4 |
| 2010/0323769 | A1 * | 12/2010 | Peng et al. | 455/575.4 |
| 2012/0238332 | A1 * | 9/2012 | Mai et al. | 455/575.4 |

* cited by examiner

*Primary Examiner* — Justin Krause
(74) *Attorney, Agent, or Firm* — Rosenberg, Klein & Lee

(57) ABSTRACT

A linkage-type synchronous slide structure of relative slide assembly includes a slide member and a relative slide member slidably connected to the slide member. The relative slide member is formed with a slide guide section. The slide member is slidable relative to the relative slide member along the slide guide section. Two extensible/retractable assemblies with a variable length are respectively oppositely disposed on two sides of the slide guide section. Second ends of the extensible/retractable assemblies are respectively pivotally connected to corresponding sections of two sides of the slide member. First ends of the extensible/retractable assemblies are pivotally connected with each other and slidable along the slide guide section. A restriction mechanism is disposed between the extensible/retractable assemblies and the relative slide member to serve as a pivotal center of the extensible/retractable assemblies for restricting axial slide thereof and synchronizing the moves of two sides of the slide member.

23 Claims, 5 Drawing Sheets

LINKAGE-TYPE SYNCHRONOUS SLIDE STRUCTURE OF RELATIVE SLIDE ASSEMBLY

BACKGROUND OF THE INVENTION

1. Field of the Invention

The present invention relates generally to a linkage-type synchronous slide structure of relative slide assembly, and more particularly to a synchronous slide mechanism widely applicable to the slide cover system of an electronic product. The linkage-type synchronous slide structure is simplified and easy to assemble. Also, the linkage-type synchronous slide structure can ensure synchronous move.

2. Description of the Related Art

Following the rapid development of electronic industries, various electronic products with slide covers or slide assemblies, such as notebooks and mobile phones, have been continuously developed. For example, U.S. Pat. No. 5,548,478 discloses a portable computing device having an adjustable hinge. The computing device mainly includes a base section (mainframe) 91 and a display section 92 movably assembled with the base section 91. A pair of pivot pins 921 respectively outward protrudes from left and right sides of the bottom of the display section 92. The pivot pins 921 are correspondingly slidably disposed in a pair of slide slots 911 longitudinally formed on left and right sides of the mainframe 91.

Accordingly, the display section 92 not only can be pivotally rotated relative to the mainframe 91 to change the view angle, but also can be back and forth slid relative to the mainframe 91 to adjust the position and achieve an optimal view distance as necessary. However, in practical operation, a user often simply pushes one side of the display section 92 with one single hand. As a result, the push force applied to the left and right pivot pins 921 of the display section 92 can be hardly uniformed. Therefore, during the sliding process, the display section 92 is likely to be slightly biased to one side. This will seriously hinder the display section 92 from smoothly sliding.

In order to solve the above problem, the prior art discloses an anti-deflection device for slide cover of an electronic apparatus. The anti-deflection device includes a first transmission unit and a second transmission unit. The electronic apparatus includes a base section and a slide section movably assembled with the base section. One side of the slide section has two slide connection ends slidably disposed on two lateral sides of the base section. The first transmission unit has two idler sets respectively disposed on inner sides of the lateral sides of the base section and at least one transmission belt longitudinally wound around the idler sets. Two sections of the transmission belt opposite to the outer sides are respectively connected with the slide connection ends. Accordingly, the slide connection ends with the transmission belt can be back and forth moved. The second transmission unit is disposed between the idler sets of the first transmission unit with the transmission belt wound around the second transmission unit, whereby the sections of the transmission belt, which are connected with the slide connection ends can be moved in the same direction. Accordingly, when one of the slide connection ends is back and forth moved, the other of the slide connection ends is driven via the first and second transmission units so as to ensure that the two slide connection ends are synchronously moved in the same direction without deflection.

However, in the above structure, the transmission belt itself is elastically extensible. Therefore, in the operation, the transmission of kinetic energy will be delayed. As a result, when slid, the slide cover or slide assembly of the electronic product will be still inevitably deflected. Moreover, after a long period of use, elastic fatigue of the transmission belt will take place. Under such circumstance, the transmission belt will lose its prestress, which is preset in the assembling process. This will lead to idling between the transmission belt and the idler sets and deterioration of the synchronous driving effect of the transmission belt. In some more serious cases, the transmission belt may detach from the idler sets to totally lose its synchronous driving effect. Furthermore, in order to keep the transmission belt in close contact with the idler sets, the transmission belt must be properly tensioned and prestressed in the assembling process. In this case, the difficulty in assembling and quality control will be increased to lower the assembling efficiency and the ratio of good products.

SUMMARY OF THE INVENTION

It is therefore a primary object of the present invention to provide a linkage-type synchronous slide structure of relative slide assembly. The components of the linkage-type synchronous slide structure have excellent structural rigidity and are able to quickly transmit driving force. Accordingly, when a force is applied to one single side of the slide member, the slide member can be slid with its two lateral sides kept synchronously moved without deflection. Accordingly, the slide member is prevented from being biased so as to ensure smooth slide of the slide member.

It is a further object of the present invention to provide the above linkage-type synchronous slide structure of relative slide assembly. The assembling process of the linkage-type synchronous slide structure is simplified so that the assembling efficiency is promoted and the ratio of good products is increased to enhance the competitive ability of the products.

It is still a further object of the present invention to provide the above linkage-type synchronous slide structure of relative slide assembly, which has simplified mechanism to lower manufacturing cost.

To achieve the above and other objects, the linkage-type synchronous slide structure of relative slide assembly of the present invention includes a slide member and a relative slide member connected to one side of the slide member. A middle section of the relative slide member is formed with a slide guide section. The linkage-type synchronous slide structure further includes two extensible/retractable assemblies having a length, which is variable with an axial force applied to the slide member. Second ends of the extensible/retractable assemblies are respectively pivotally connected to corresponding sections of two lateral sides of the slide member. First ends of the extensible/retractable assemblies are pivotally connected with each other. The pivotally connected sections of the extensible/retractable assemblies are slidable along the slide guide section. A restriction mechanism is disposed between the extensible/retractable assemblies and the relative slide member. The restriction mechanism serves as a pivotal center of the extensible/retractable assemblies for restricting axial slide of the extensible/retractable assemblies.

In the above linkage-type synchronous slide structure, the restriction mechanism is composed of two restriction members oppositely disposed on two lateral sides of the slide guide section of the relative slide member and two restriction sections respectively formed in the middle sections of the extensible/retractable assemblies. The restriction members are projecting pins projecting from a surface of the relative slide member, while the restriction sections are slots axially extending along the extensible/retractable assemblies. The restriction sections are connected with the restriction members to restrict axial slide of the extensible/retractable assemblies.

In the above linkage-type synchronous slide structure, two support sections are respectively oppositely disposed on two lateral sides of the slide member. The support sections are pivot pins projecting from a surface of the slide member. Two second pivoted ends are disposed at the second ends of the extensible/retractable assemblies and pivotally connected with the support sections. The second pivoted ends are pinholes in which the pivot pins are fitted.

In the above linkage-type synchronous slide structure, two first pivoted ends are disposed at the first ends of the extensible/retractable assemblies distal from the second pivoted ends. The first pivoted ends are pinholes in which the pivotal slide guide member is pivotally fitted.

In the above linkage-type synchronous slide structure, each extensible/retractable assembly is composed of a first link and a second link fitted with each other.

In the above linkage-type synchronous slide structure, the first pivoted end is disposed at one end of the first link, which end is distal from the second link and the second pivoted end is disposed at one end of the second link, which end is distal from the first link.

In the above linkage-type synchronous slide structure, an end section of one of the first and second links is a connected end. The connected end is formed with a fitting channel. An end section of the other of the first and second links is a connection end slidably extending into the fitting channel. The fitting channel extends in an extending/retracting direction of the extensible/retractable assembly.

In the above linkage-type synchronous slide structure, the slide guide section of the relative slide member is a slide slot. A pivotal slide guide member passes through the pivotally connected sections of the two extensible/retractable assemblies and extends into the slide guide section to pivotally connect the pivotally connected sections with each other.

The present invention can be best understood through the following description and accompanying drawings, wherein:

DETAILED DESCRIPTION OF THE PREFERRED EMBODIMENTS

Figure 1:
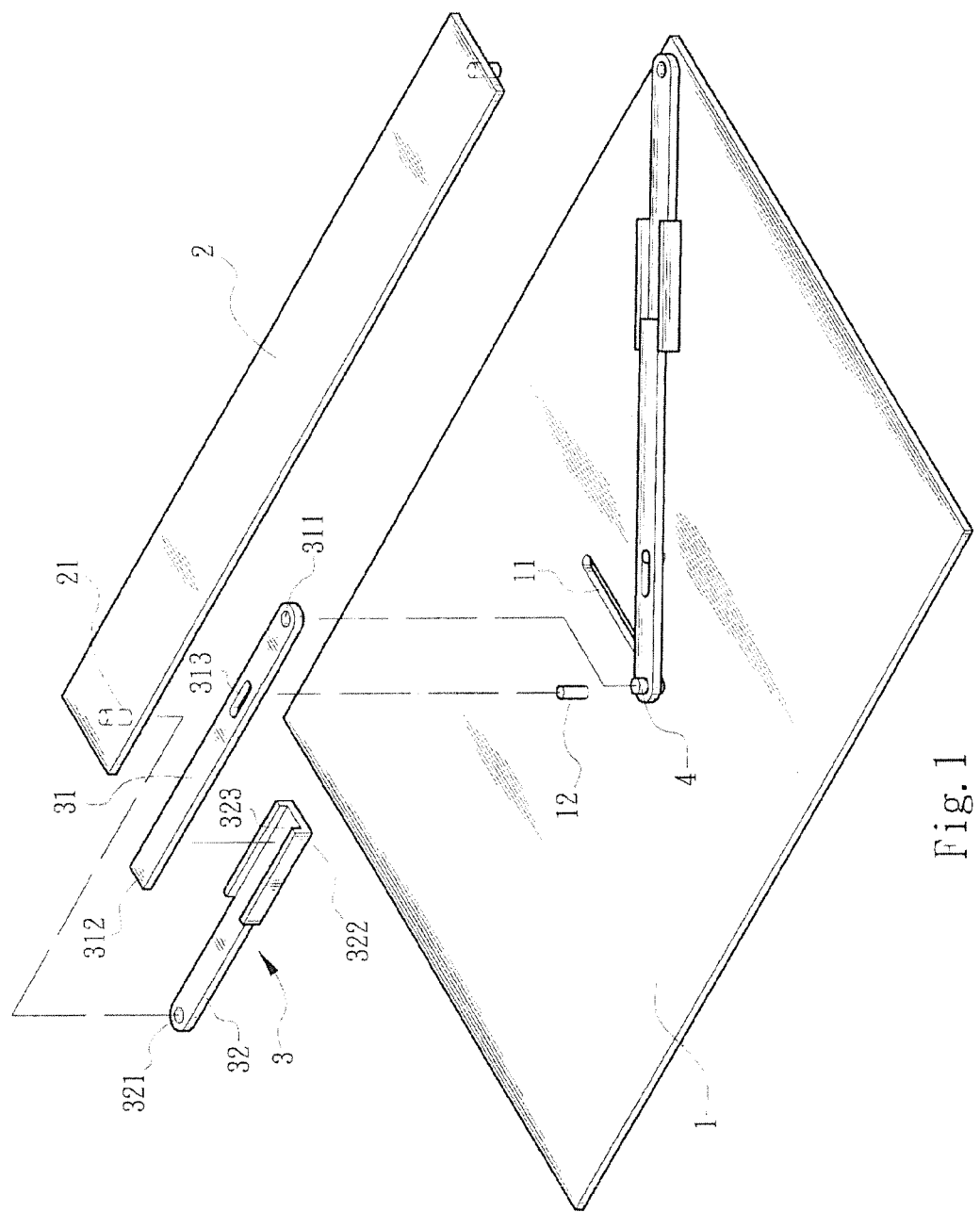
FIG. 1 is a perspective exploded view of the present invention.
Figure 2:
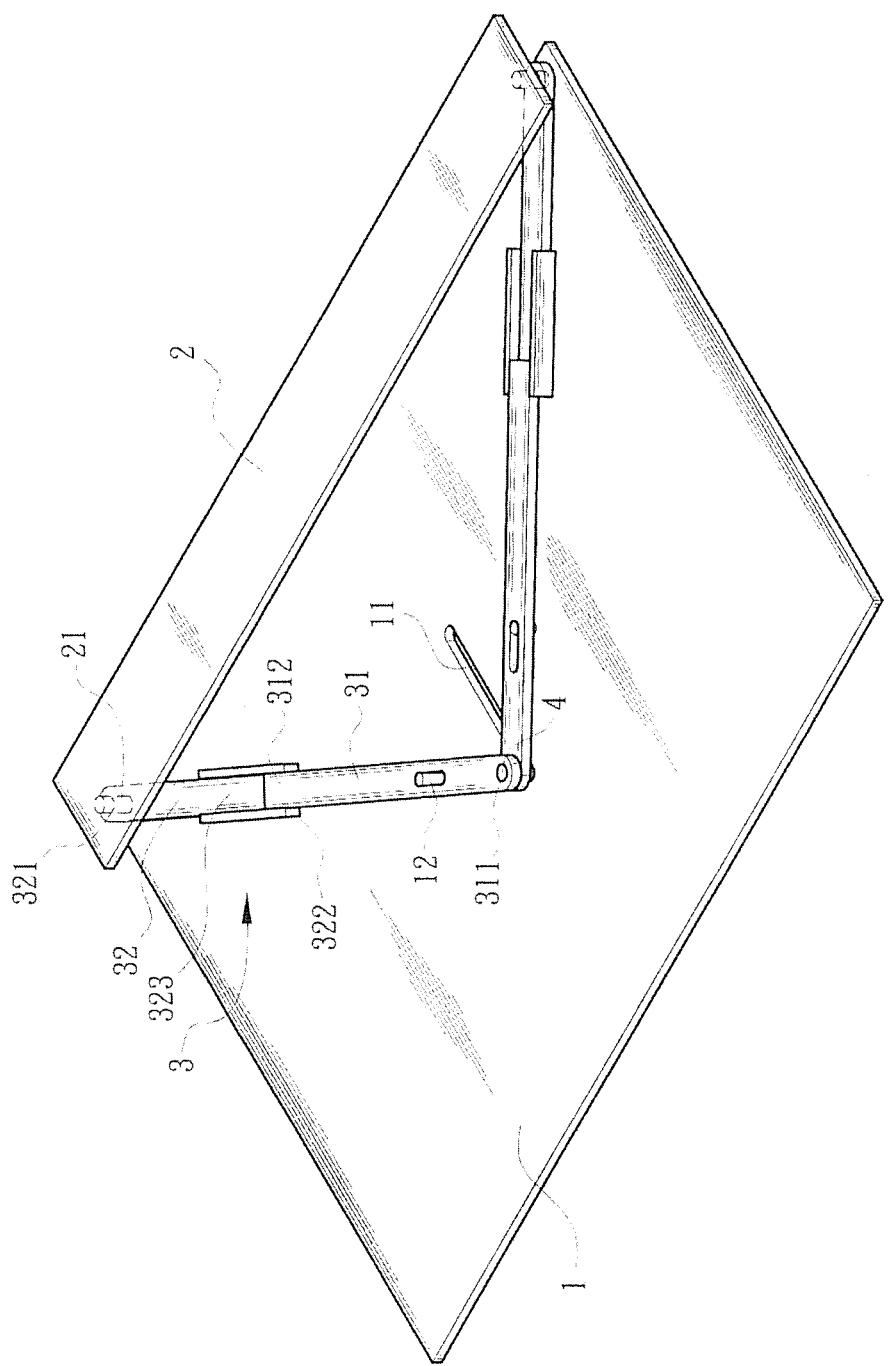
FIG. 2 is a perspective assembled view of the present invention.

Please refer to FIGS. 1 and 2. The linkage-type synchronous slide structure of relative slide assembly of the present invention includes a relative slide member 1, a slide member 2, two extensible/retractable assemblies 3 and a pivotal slide guide member 4. A middle section of the relative slide member 1 is formed with a slide guide section 11, (which can be a slide slot). Two restriction members 12 are respectively oppositely disposed at the middles of two lateral sides of the slide guide section 11. (The restriction members 12 can be projecting pins projecting from a surface of the relative slide member 1). The slide member 2 can be reciprocally slid along the track of the slide guide section 11 of the relative slide member 1 under the guide of an external guide mechanism (not shown). Two support sections 21, (which can be pivot pins projecting from a surface of the slide member 2), are respectively oppositely disposed on two lateral sides of the slide member 2. Each extensible/retractable assembly 3 is composed of a first link 31 and a second link 32. A first pivoted end 311, (which can be a pinhole), and a connection end 312 are respectively disposed at two ends of one of the first and second links 31, 32. (In the embodiment as shown in the drawings, the first pivoted end 311 and the connection end 312 are respectively disposed at two ends of the first link 31). A second pivoted end 321, (which can be a pinhole), and a connected end 322 are respectively disposed at two ends of the other of the first and second links 31, 32. (In the embodiment as shown in the drawings, the second pivoted end 321 and the connected end 322 are respectively disposed at two ends of the second link 32). The connected end 322 is formed with a fitting channel 323 for fitting with the connection end 312, whereby under a force, the first link 31 can be connected with the second link 32 and slid along the fitting channel 323 to extend/retract the extensible/retractable assembly 3. In addition, a middle section of the extensible/retractable assembly 3 is formed with a restriction section 313, which can be a slot extending in an extending/retracting direction of the extensible/retractable assembly 3. (The restriction section 313 can be formed on the first link 31 or the second link 32. In the embodiment as shown in the drawings, the restriction section 313 is formed on the first link 31). The restriction member 12 (projecting pin) can be connected with the restriction section 313 (slot) to form a restriction mechanism for restricting the pivotal center and axial slide of the extensible/retractable assembly 3. In practice, the support sections 21 (pivot pins) on two lateral sides of the slide member 2 are pivotally connected to the second pivoted ends 321 (pinholes) of two extensible/retractable assemblies 3 and the pivotal slide guide member 4, (which can be a shaft rod), is pivotally fitted in the first pivoted ends 311 (pinholes). Also, the pivotal slide guide member 4 slidably extends into the slide guide section 11 to provide a slide guide effect.

Figure 3:
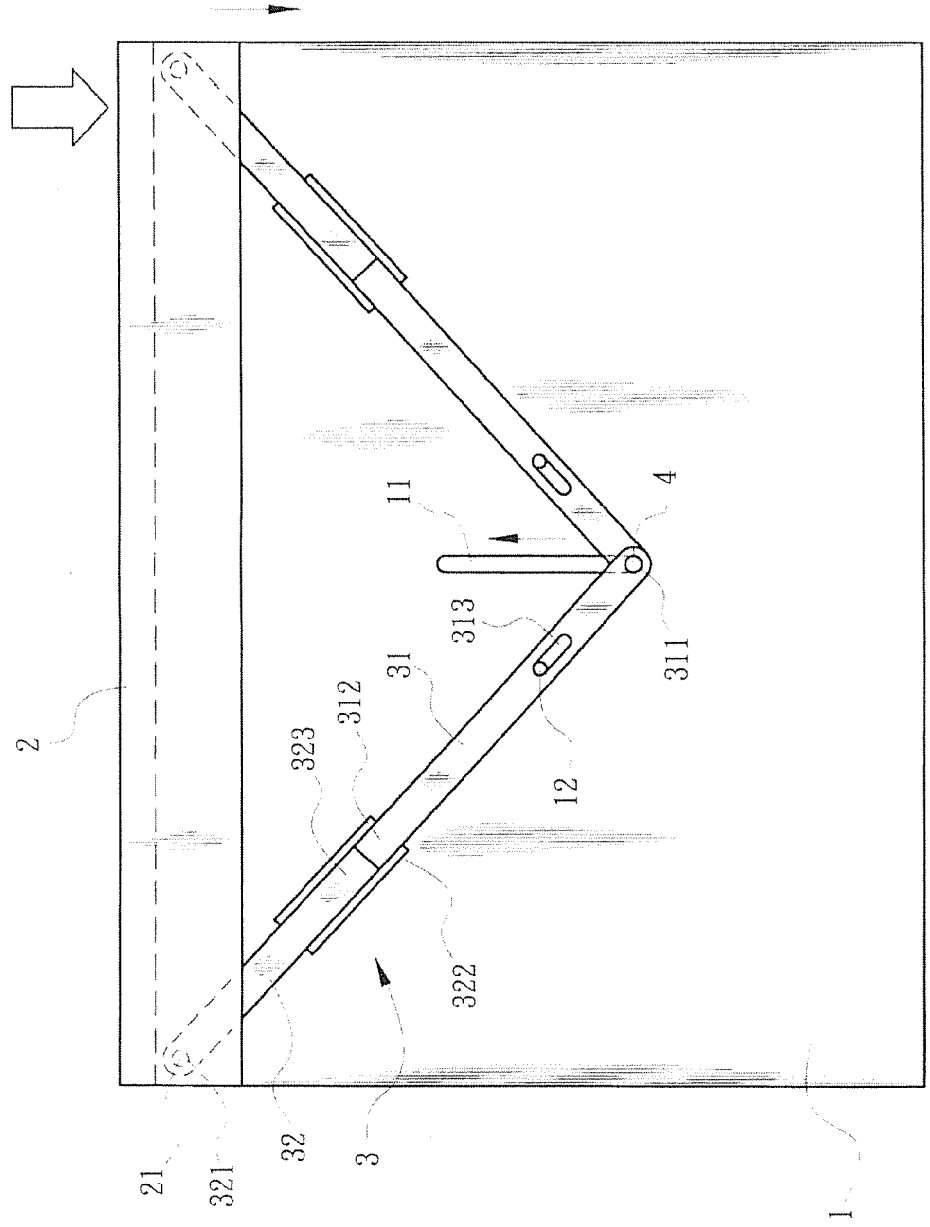
FIG. 3 is a plane view showing the operation of the present invention in one state.
Figure 4:
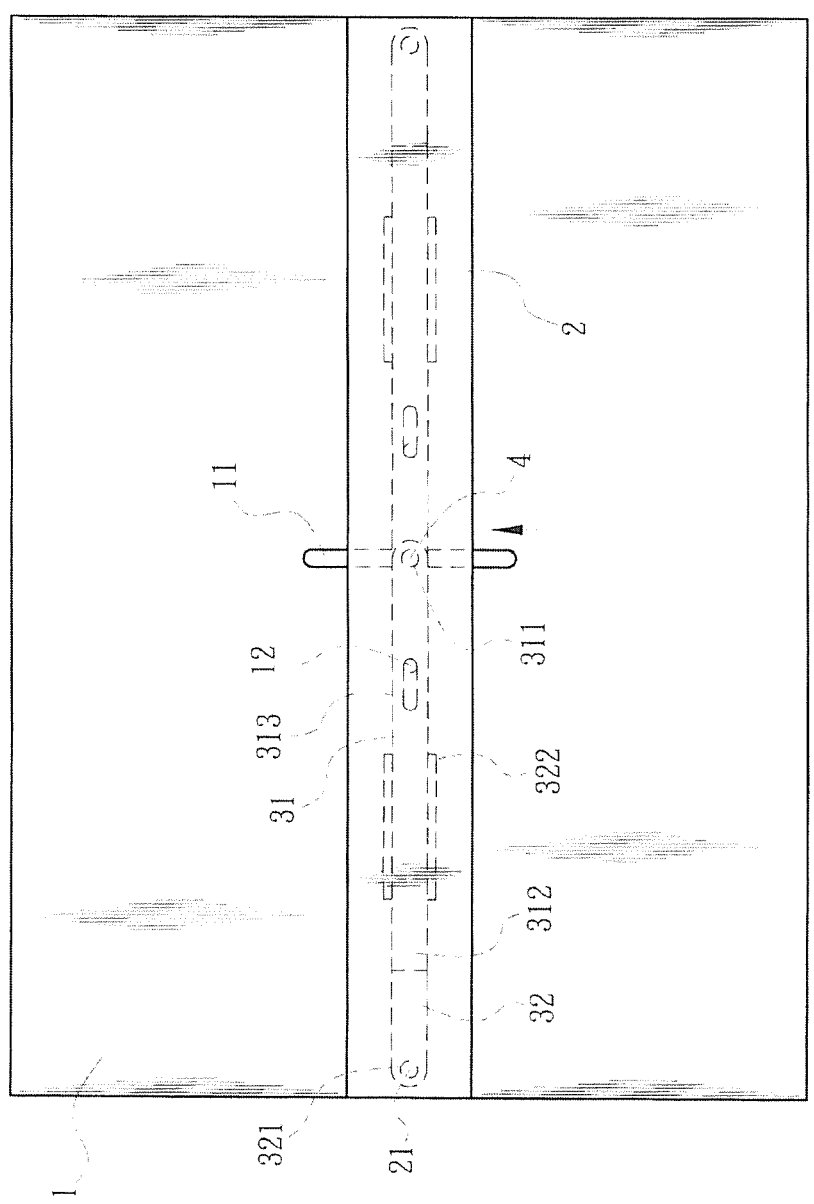
FIG. 4 is a plane view showing the operation of the present invention in another state.
Figure 5:
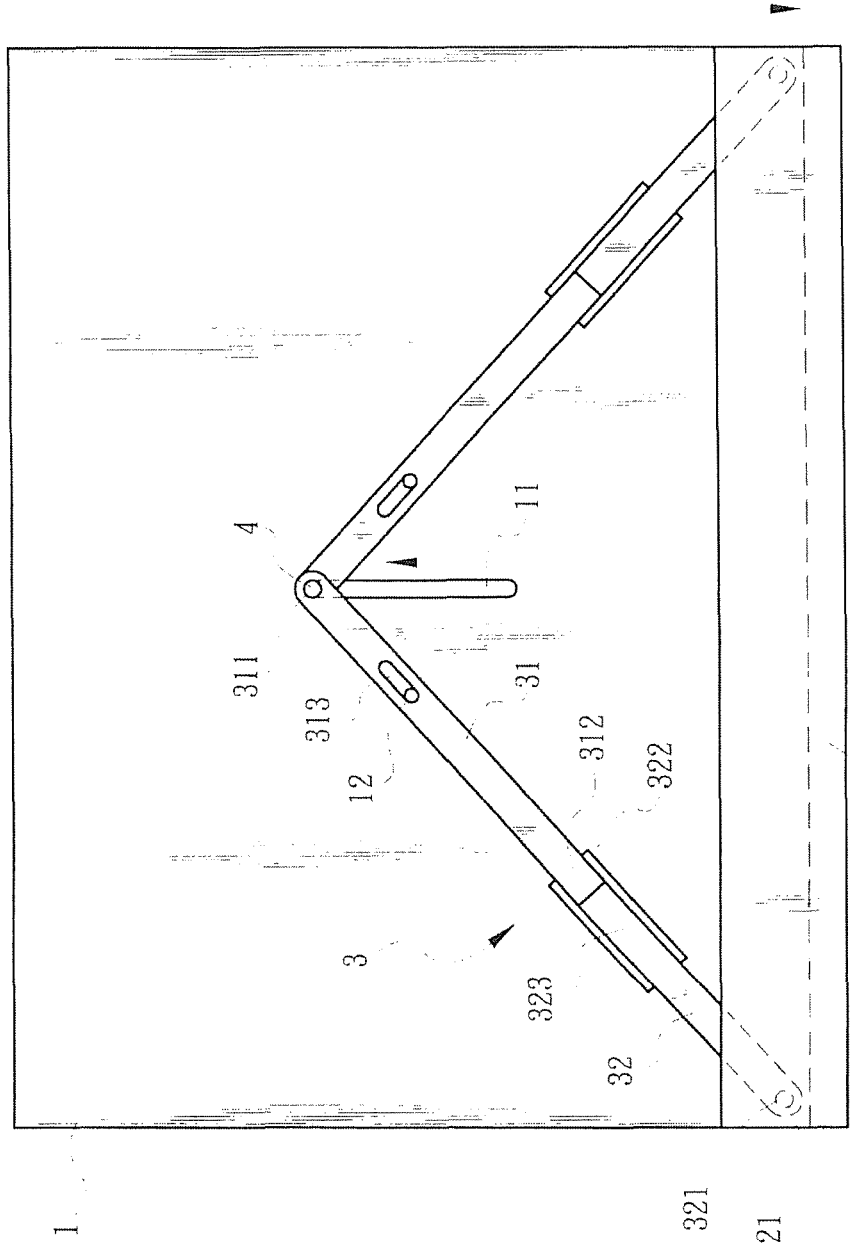
FIG. 5 is a plane view showing the operation of the present invention in still another state.

Please now refer to FIGS. 3 to 5. In operation, when the slide member 2 is positioned in an initial fully closed (or fully opened) position at one end of the relative slide member 1 as shown in FIG. 3, the second pivoted ends 321 of the extensible/retractable assemblies 3 are respectively obliquely connected with two ends (support sections 21) of the slide member 2. In this case, the extensible/retractable assemblies 3 have a longest length. When a force is applied to one side of the slide member 2 to slide the slide member 2, the length of the extensible/retractable assembly 3 (the first and second links 31, 32) on the forced side is gradually shortened. In addition, under the restriction of the restriction member 12, the extensible/retractable assembly 3 on the forced side starts to pivotally rotate. At this time, the first pivoted end 311 drives the pivotal slide guide member 4 to slide within the slide guide section 11. In the meantime, the pivotal slide guide member also drives the first pivoted end 311 of the extensible/retractable assembly 3 of the other side to slide. Accordingly, under the restriction of the restriction member 12, the extensible/retractable assembly 3 of the other side starts to pivotally rotate. During the pivotal rotation, the length of the extensible/retractable assembly 3 of the other side is gradually synchronously shortened. When the slide member 2 slides to a position where the two extensible/retractable assemblies 3 are lined up, the two extensible/retractable assemblies 3 have a shortest length (as shown in FIG. 4). After the slide member 2 passes through the position as shown in FIG. 4, the two extensible/retractable assemblies 3 are continuously pivotally rotated around the restriction members 12 and the length of the extensible/retractable assemblies 3 is gradually increased until the slide member 2 slides to a final fully opened (or fully closed) position at the other end of the relative slide member 1 as shown in FIG. 5. By means of the pivotal slide guide member 4, the two extensible/retractable assemblies 3 are nearly synchronously driven to extend/retract. Accordingly, the slide member 2 can be slid with its two lateral sides kept synchronously moved without deflection. Accordingly, the slide member 2 is prevented from being biased due to unbalanced force applied to one single side of the slide member 2 so as to ensure smooth slide thereof.

Moreover, during the relative slide process of the slide member 2 and the relative slide member 1, when the two extensible/retractable assemblies 3 are pivotally rotated, the first pivoted ends 311 are restricted to move along the slide guide section 11 by the pivotal slide guide member 4. Therefore, the first links 31 will slide toward the second links 32. At this time, the restriction section 313 will absorb the relative move between the first links 31 and the restriction members 12, whereby the extensible/retractable assemblies 3 (the first links 31) can keep pivotally rotatably connected with each other.

In conclusion, the linkage-type synchronous slide structure of relative slide assembly of the present invention is simplified and easy to assemble. Also, the linkage-type synchronous slide structure of relative slide assembly of the present invention can ensure synchronous move.

The above embodiments are only used to illustrate the present invention, not intended to limit the scope thereof. Many modifications of the above embodiments can be made without departing from the spirit of the present invention.

What is claimed is:

1. A linkage synchronous slide structure of relative slide assembly, comprising:
   a slide member;
   a relative slide member connected to one side of the slide member, a middle section of the relative slide member being formed with a slide guide section; and
   two extensible/retractable assemblies having a length, which is variable with an axial force applied to the slide member, second ends of the extensible/retractable assemblies being respectively pivotally connected to corresponding sections of two lateral sides of the slide member, first ends of the extensible/retractable assemblies being pivotally connected with each other, the pivotally connected sections of the extensible/retractable assemblies being slidable along the slide guide section, a restriction mechanism being disposed between the extensible/retractable assemblies and the relative slide member, the restriction mechanism serving as a pivotal center of the extensible/retractable assemblies for restricting axial slide of the extensible/retractable assemblies;
   wherein each extensible/retractable assembly is composed of a first link and a second link fitted with each other, and
   an end section of one of the first and second links is a connected end, the connected end being formed with a fitting channel, an end section of the other of the first and second links being a connection end slidably extending into the fitting channel.

2. The linkage synchronous slide structure of relative slide assembly as claimed in claim 1, wherein the restriction mechanism is composed of two restriction members oppositely disposed on two lateral sides of the slide guide section of the relative slide member and two restriction sections respectively formed in the middle sections of the extensible/retractable assemblies.

3. The linkage synchronous slide structure of relative slide assembly as claimed in claim 2, wherein two support sections are respectively oppositely disposed on two lateral sides of the slide member, two second pivoted ends being disposed at the second ends of the extensible/retractable assemblies and pivotally connected with the support sections.

4. The linkage synchronous slide structure of relative slide assembly as claimed in claim 2, wherein the slide guide section of the relative slide member is a slide slot, a pivotal slide guide member passing through the pivotally connected sections of the two extensible/retractable assemblies and extending into the slide guide section to pivotally connect the pivotally connected sections with each other.

5. The linkage synchronous slide structure of relative slide assembly as claimed in claim 2, wherein the restriction members are projecting pins projecting from a surface of the relative slide member, while the restriction sections are slots axially extending along the extensible/retractable assemblies, the projecting pins being positioned in slots.

6. The linkage synchronous slide structure of relative slide assembly as claimed in claim 5, wherein the slide guide section of the relative slide member is a slide slot, a pivotal slide guide member passing through the pivotally connected sections of the two extensible/retractable assemblies and extending into the slide guide section to pivotally connect the pivotally connected sections with each other.

7. The linkage synchronous slide structure of relative slide assembly as claimed in claim 5, wherein two support sections are respectively oppositely disposed on two lateral sides of the slide member, two second pivoted ends being disposed at the second ends of the extensible/retractable assemblies and pivotally connected with the support sections.

8. The linkage synchronous slide structure of relative slide assembly as claimed in claim 1, wherein two support sections are respectively oppositely disposed on two lateral sides of the slide member, two second pivoted ends being disposed at the second ends of the extensible/retractable assemblies and pivotally connected with the support sections.

9. The linkage synchronous slide structure of relative slide assembly as claimed in claim 8, wherein the support sections are pivot pins projecting from a surface of the slide member, while the second pivoted ends are pinholes.

10. The linkage synchronous slide structure of relative slide assembly as claimed in claim 9, wherein the slide guide section of the relative slide member is a slide slot, a pivotal slide guide member passing through the pivotally connected sections of the two extensible/retractable assemblies and extending into the slide guide section to pivotally connect the pivotally connected sections with each other.

11. The linkage synchronous slide structure of relative slide assembly as claimed in claim 8, wherein the fitting channel extends in an extending/retracting direction of the extensible/retractable assembly.

12. The linkage synchronous slide structure of relative slide assembly as claimed in claim 8, wherein the slide guide section of the relative slide member is a slide slot, a pivotal slide guide member passing through the pivotally connected sections of the two extensible/retractable assemblies and extending into the slide guide section to pivotally connect the pivotally connected sections with each other.

13. The linkage synchronous slide structure of relative slide assembly as claimed in claim 9, wherein two first pivoted ends are disposed at the first ends of the extensible/retractable assemblies distal from the second pivoted ends, the first pivoted ends being pinholes in which the pivotal slide guide member is pivotally fitted.

14. The linkage synchronous slide structure of relative slide assembly as claimed in claim 13, wherein the slide guide section of the relative slide member is a slide slot, a pivotal slide guide member passing through the pivotally connected sections of the two extensible/retractable assemblies and extending into the slide guide section to pivotally connect the pivotally connected sections with each other.

15. The linkage synchronous slide structure of relative slide assembly as claimed in claim 13, wherein the fitting channel extends in an extending/retracting direction of the extensible/retractable assembly.

16. The linkage synchronous slide structure of relative slide assembly as claimed in claim 15, wherein the slide guide section of the relative slide member is a slide slot, a pivotal slide guide member passing through the pivotally connected sections of the two extensible/retractable assemblies and extending into the slide guide section to pivotally connect the pivotally connected sections with each other.

17. The linkage synchronous slide structure of relative slide assembly as claimed in claim 1, wherein the fitting channel extends in an extending/retracting direction of the extensible/retractable assembly.

18. The linkage synchronous slide structure of relative slide assembly as claimed in claim 1, wherein the slide guide section of the relative slide member is a slide slot, a pivotal slide guide member passing through the pivotally connected sections of the two extensible/retractable assemblies and extending into the slide guide section to pivotally connect the pivotally connected sections with each other.

19. A linkage synchronous slide structure of relative slide assembly, comprising:
  a slide member;
  a relative slide member connected to one side of the slide member, a middle section of the relative slide member being formed with a slide guide section; and
  two extensible/retractable assemblies having a length, which is variable with an axial force applied to the slide member, second ends of the extensible/retractable assemblies being respectively pivotally connected to corresponding sections of two lateral sides of the slide member, first ends of the extensible/retractable assemblies being pivotally connected with each other, the pivotally connected sections of the extensible/retractable assemblies being slidable along the slide guide section, a restriction mechanism being disposed between the extensible/retractable assemblies and the relative slide member, the restriction mechanism serving as a pivotal center of the extensible/retractable assemblies for restricting axial slide of the extensible/retractable assemblies;
  wherein two support sections are respectively oppositely disposed on two lateral sides of the slide member, two second pivoted ends being disposed at the second ends of the extensible/retractable assemblies and pivotally connected with the support sections, the support sections are pivot pins projecting from a surface of the slide member, while the second pivoted ends are pinholes;
  two first pivoted ends are disposed at the first ends of the extensible/retractable assemblies distal from the second pivoted ends, the first pivoted ends being pinholes in which the pivotal slide guide member is pivotally fitted;
  each extensible/retractable assembly is composed of a first link and a second link fitted with each other, the first pivoted end being disposed at one end of the first link, which end is distal from the second link, the second pivoted end being disposed at one end of the second link, which end is distal from the first link; and
  an end section of one of the first and second links is a connected end, the connected end being formed with a fitting channel, an end section of the other of the first and second links being a connection end slidably extending into the fitting channel.

20. The linkage synchronous slide structure of relative slide assembly as claimed in claim 19, wherein the fitting channel extends in an extending/retracting direction of the extensible/retractable assembly.

21. The linkage synchronous slide structure of relative slide assembly as claimed in claim 19, wherein the slide guide section of the relative slide member is a slide slot, a pivotal slide guide member passing through the pivotally connected sections of the two extensible/retractable assemblies and extending into the slide guide section to pivotally connect the pivotally connected sections with each other.

22. The linkage synchronous slide structure of relative slide assembly as claimed in claim 20, wherein the slide guide section of the relative slide member is a slide slot, a pivotal slide guide member passing through the pivotally connected sections of the two extensible/retractable assemblies and extending into the slide guide section to pivotally connect the pivotally connected sections with each other.

23. A linkage synchronous slide structure of relative slide assembly, comprising:
  a slide member;
  a relative slide member connected to one side of the slide member, a middle section of the relative slide member being formed with a slide guide section; and
  two extensible/retractable assemblies having a length, which is variable with an axial force applied to the slide member, second ends of the extensible/retractable assemblies being respectively pivotally connected to corresponding sections of two lateral sides of the slide member, first ends of the extensible/retractable assemblies being pivotally connected with each other, the pivotally connected sections of the extensible/retractable assemblies being slidable along the slide guide section, a restriction mechanism being disposed between the extensible/retractable assemblies and the relative slide member, the restriction mechanism serving as a pivotal center of the extensible/retractable assemblies for restricting axial slide of the extensible/retractable assemblies;
  wherein the slide guide section of the relative slide member is a slide slot, a pivotal slide guide member passing through the pivotally connected sections of the two extensible/retractable assemblies and extending into the slide guide section to pivotally connect the pivotally connected sections with each other.

* * * * *